United States Patent [19]
Majumdar et al.

[11] Patent Number: 5,838,005
[45] Date of Patent: *Nov. 17, 1998

[54] USE OF FOCUSED ION AND ELECTRON BEAMS FOR FABRICATING A SENSOR ON A PROBE TIP USED FOR SCANNING MULTIPROBE MICROSCOPY AND THE LIKE

[75] Inventors: Arunava Majumdar, Santa Barbara; Jie Lai; Ke Luo, both of Goleta, all of Calif.

[73] Assignee: The Regents of the University of California, Oakland, Calif.

[*] Notice: The term of this patent shall not extend beyond the expiration date of Pat. No. 5,581,083.

[21] Appl. No.: 732,068

[22] Filed: Oct. 16, 1996

Related U.S. Application Data

[63] Continuation-in-part of Ser. No. 439,425, May 11, 1995, Pat. No. 5,581,083.

[51] Int. Cl.$^6$ ...................................................... H01J 37/26
[52] U.S. Cl. ........................... 250/306; 250/234; 73/105; 376/124; 376/164; 136/228
[58] Field of Search ..................................... 250/306, 234; 73/105; 374/124, 164; 136/228

[56] References Cited

U.S. PATENT DOCUMENTS

| 587,568 | 8/1897 | Burton . | |
|---|---|---|---|
| 3,723,690 | 3/1973 | Nakada et al. | 218/64 M |
| 3,974,357 | 8/1976 | Saito et al. | 219/69 M |
| 3,988,563 | 10/1976 | Swengel, Sr. et al. | 219/104 |

(List continued on next page.)

OTHER PUBLICATIONS

Eigler et al., "Positioning Single Atoms with a Scanning Tunneling Microscope," Nature, v 344, pp. 524–526, Apr. 5, 1990.
Mamin et al., "Atomic Emission from a Gold Scanning–Tunneling–Microscope Tip," Physical Review Letters v 65, n 19, pp. 2418–2421, 1990.
Whitman, "Mamip. of Adsorbed Atoms & Creation of New Struc. on Room–temp. Surfaces w/a Scanning Tunneling Microscope," Science, pp. 1206–1210, Mar. 1991.
Betzig et al., "Near–Field Optics: Microscopy Spectroscopy, & Surface Modif. Beyond the Diffraction Limit," Science, v 257, pp. 189–195, 1992.
Majumdar et al., "Nanometer–scale Lithography Using the Atomic Force Microscope," Appl. Phys. Lett., v 61, n19, pp. 2293–2295, 1992.
Majumdar et al., "Thermal Imaging Using the Atomic Force Microscope," Appl. Phys. Lett., v62, n 20, pp. 2501–2503, 1993.
Betzig et al., "Single Molecules Observed by Near–Field Scanning Optical Microscopy," Science, v 262, pp. 1422–1425, 1993.
Lyo et al., "Field–Induced Nanometer—to Atomic Scale Manip. of Silicon Surfaces w/the STM," Science, v 253, pp. 173–176.

*Primary Examiner*—Jack I. Berman
*Attorney, Agent, or Firm*—Daniel L. Dawes

[57] ABSTRACT

Nanometer holes can be reliably and repeatedly defined in the tips of cantilevered probes and used in various types of scanning multiprobe microscopy by defining the hole within a layer disposed on the tip using focused electron or ion beams. The drilling of the hole on the apex of the tip and is stopped just as soon as the hole is defined through an overlying insulating layer under which lies a metallic or semiconductor layer at the apex. The hole is then backfilled with another metallic or semiconductor layer so that an active electrical junction is formed between the two layers through the hole in the insulating layer. The hole may be defined in conductive layers in various combinations with oxide layers, other metal layers and semiconductor materials to define Schottky diodes, thermocouple junctions, near-field optical detectors, and atomic force tips. As a result, two or more physical interactions may be simultaneously exploited between the fabricated tip and the scanned sample from which a scanned image may be produced.

20 Claims, 7 Drawing Sheets

U.S. PATENT DOCUMENTS

| | | | |
|---|---|---|---|
| 4,045,311 | 8/1977 | Matsui et al. | 204/129.55 |
| 4,069,121 | 1/1978 | Baud et al. | 204/129.3 |
| 4,278,871 | 7/1981 | Schmidt-Kufeke et al. | 219/384 |
| 4,393,292 | 7/1983 | Inoue | 219/64 M |
| 4,866,237 | 9/1989 | Inoue | 219/76.13 |
| 4,992,639 | 2/1991 | Watkins et al. | 219/69.2 |
| 5,281,788 | 1/1994 | Abiko et al. | 219/69.14 |
| 5,294,790 | 3/1994 | Ohta et al. | 250/306 |
| 5,317,141 | 5/1994 | Thomas | 250/491.1 |
| 5,322,985 | 6/1994 | Ohba et al. | 219/121.54 |
| 5,581,083 | 12/1996 | Majumdar et al. | 250/306 |

USE OF FOCUSED ION AND ELECTRON BEAMS FOR FABRICATING A SENSOR ON A PROBE TIP USED FOR SCANNING MULTIPROBE MICROSCOPY AND THE LIKE

RELATED APPLICATIONS

This application is a continuation-in-part application of U.S. patent application Ser. No. 08/439,425, filed May 11, 1995, entitled "A METHOD FOR FABRICATING A SENSOR ON A PROBE TIP USED FOR ATOMIC FORCE MICROSCOPY AND THE LIKE," now U.S. Pat. No. 5,581,083, assigned to the same assignee as the present application.

This invention was made with Government support under Grant No. CTS-9215818 and CTS-9257536, awarded by the National Science Foundation. The Government has certain rights in this invention.

BACKGROUND OF THE INVENTION

1. Field of the Invention

The invention relates to the field of manufacturing nanometer probe tips, and in particular, to probe tips having sensor structures and holes defined at the tip of the probe of the order of a few nanometers for use in atomic force microscopy, scanning tunnel microscopy, near field optical sensing and related scanning technologies.

2. Description of the Prior Art

Atomic force microscopes, scanning tunneling microscopes, near field optical probes and similar nanometer type probes utilize a small, sharp needle-like probe, which is brought into close proximity with the sample surface under controlled conditions. The probe tip is sharp and is of the order of nanometers. While controlling the physical interaction between the probe tip and the scan surface, the sample is scanned by the probe, typically by moving the sample with a piezoelectric controlled stage. Deflections in the probe are typically measured through optical beam methods, namely by the deflection of an optical beam reflected off a lever to which the probe tip is attached or which is an integral part of the probe and tip. Very small movements in the beam caused by a sample-to-tip interaction are thus translated optically into distinguishable optical and electronic signals. Movement of the piezoelectric stage on which the sample is mounted is combined in a graphic computer to provide a two dimensional map of the sample-to-tip interaction, which is usually determined by one or more characteristics of the sample surface.

The interaction between the probe tip may be of any type imaginable and typically includes physical interactions which are electronic, electrostatic, mechanical, thermal, chemical, optical or magnetic in nature. Surface images containing the information regarding a particular interaction on the surface with the probe tip can be attained with an extremely high resolution. Nanometer resolution or resolution on the angstrom atomic scale are typically achieved.

Although it is desirable to image the surface using all conceivable physical interactions between the probe tip and surface, scanning probes typically are designed to utilize a single interaction, or at least are predominantly affected by a single physical interaction. Heretofore, it has been extremely difficult to build probes which have a design that can materially respond to two or more different types of physical interactions between the probe tip and sample.

Since most of the sample-to-tip interactions are near-field effects, such as in the case of electron tunneling used in scanning tunneling microscopy, it is important to be able to fabricate the sensor immediately at the end of the probe tip in order to be as close as possible to the proximity or near-field effect. In addition, the requirement for spatial resolution for scanning microscopy is typically in the nanometer range. Therefore, the sensor size must be of the same order of magnitude, that is also in the nanometer range.

Prior art attempts to define sensor areas using microphotolithography has been extremely difficult even when using high frequency or high energy radiation. First, alignment of the photolithography masks to a few nanometers to locate the sensor exactly at the probe tip ranges from very difficult to impossible. Second, microphotolithography does not have the spatial resolution capable of making controllable patterns in the range below approximately 300 nanometers. While electron beam lithography can be used below the 300 nanometer limit, the deposition of photoresists on a needle-like, nonplanar probe tip is difficult, if not impossible, because of the difficulty in controlling the thickness of the mask layer. Repeatability of mask thickness is unattainable and yields are erratic. Therefore, what is needed is some type of nanofabrication process which is repeatable controllable to provide sensor sizes and locations without these defects.

Also what is needed is a method for fabricating a probe which can be used to respond to two or more physical interactions, and which will be able to locate the sensor at the very end of the probe tip and yet still define the sensing area to be only a few nanometers in size.

BRIEF SUMMARY OF THE INVENTION

The invention is an improvement in a method for forming a sensor comprising the steps of providing a probe with a pointed tip having an apex, and disposing a first layer on the probe and on the tip of the probe. A second layer is disposed on the first layer. A charged beam is focused on the tip of the probe to define a hole through the second layer to expose the first layer over the apex. A third layer is disposed over the second layer and the exposed portion of the first layer over the apex to form a junction between the third and first layers over the apex, the junction forming a sensing device. As a result, a probe with a dual sensing device is fabricated.

The charged beam is a beam of either ions or electrons focused on the tip. The first layer disposed on the probe is a layer of metal or semiconductor. The second layer, which is disposed on the first layer, is an insulating layer. The third layer which is disposed over the second layer is preferably a metal or semiconductor layer so that it forms an electrically active junction between the first and third layers.

In one embodiment the probe is comprised of an optically transmissive material and the improvement further comprises providing an optical detector for receiving light through the tip of the probe through the hole defined in the first conductive layer to provide a near-field optical sensor.

The invention is also defined as an improvement in a method for forming a sensor comprising the steps of providing a probe with a pointed tip having an apex, and disposing a first, second and third layer on the probe and on the tip of the probe. A charged beam is focused on the tip of the probe to define a hole through the third layer to expose the second layer over the apex. The exposed portion of the second layer disposed over the apex is removed to expose the first layer disposed over the apex. A fourth layer is disposed over at least the exposed portion of the first layer to form a junction between the fourth and first layers. As a result, a probe with a dual sensing device is fabricated.

The fourth layer may be identical to the composition of the second layer, but without impurities injected by the focusing of the charged beam on the second layer, or different than the composition of the second layer, but still without the impurities injected by the focusing of the charged beam on the second layer.

In one embodiment the first disposed layer on the probe and on the tip of the probe is a semiconductive material and the fourth disposed layer over at least the exposed portion of the first layer is a metallic layer so that a Schottky diode is formed at the apex of the tip.

In another embodiment the first layer disposed on the probe and on the tip is a first type of metallic layer and the fourth layer disposed over at least the exposed portion of the first layer is a second type of metallic layer so that a thermocouple junction is formed at the apex of the tip.

In yet another embodiment, after removing the exposed portion of the second layer to expose the first layer disposed over the apex, a quick directional etching is made of the second layer to remove any remaining traces of the second layer within the hole while leaving remaining portions of the second layer beyond the hole substantially intact on the first layer.

The invention may be better visualized by now turning to the following drawings wherein like elements are referenced by like numerals.

The invention and its various embodiments can now be understood by turning to the following description of the detailed embodiments.

DETAILED DESCRIPTION OF THE PREFERRED EMBODIMENTS

Nanometer holes can be reliably and repeatedly defined in the tips of cantilevered probes and used in various types of scanning multiprobe microscopy by defining the hole within a layer disposed on the tip using focused electron or ion beams. The drilling of the hole on the apex of the tip and is stopped just as soon as the hole is defined through an overlying insulating layer under which lies a metallic or semiconductor layer at the apex. The hole is then backfilled with another metallic or semiconductor layer so that an active electrical junction is formed between the two layers through the hole in the insulating layer. The hole may be defined in conducting layers in various combinations with oxide layers, other metal layers and semiconductor materials to define Schottky diodes, thermocouple junctions, near-field optical detectors, and atomic force tips. As a result, two or more physical interactions may be simultaneously exploited between the fabricated tip and the scanned sample from which a scanned image may be produced.

Figure 1:
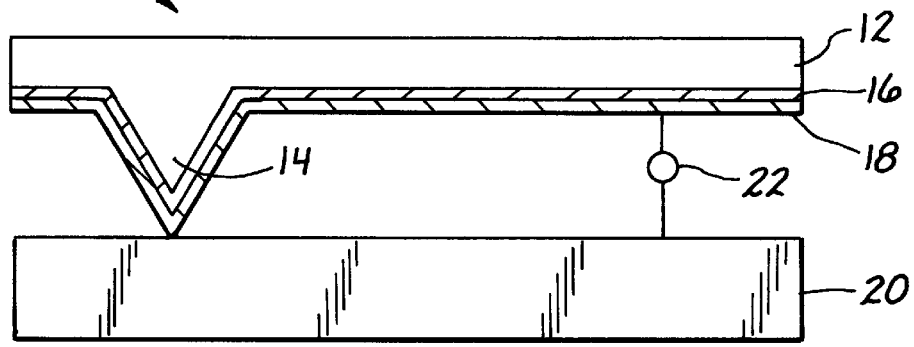
FIG. 1 is a simplified diagrammatic side cross-sectional view of a cantilever probe as used in atomic force microscopy.
Figure 2:
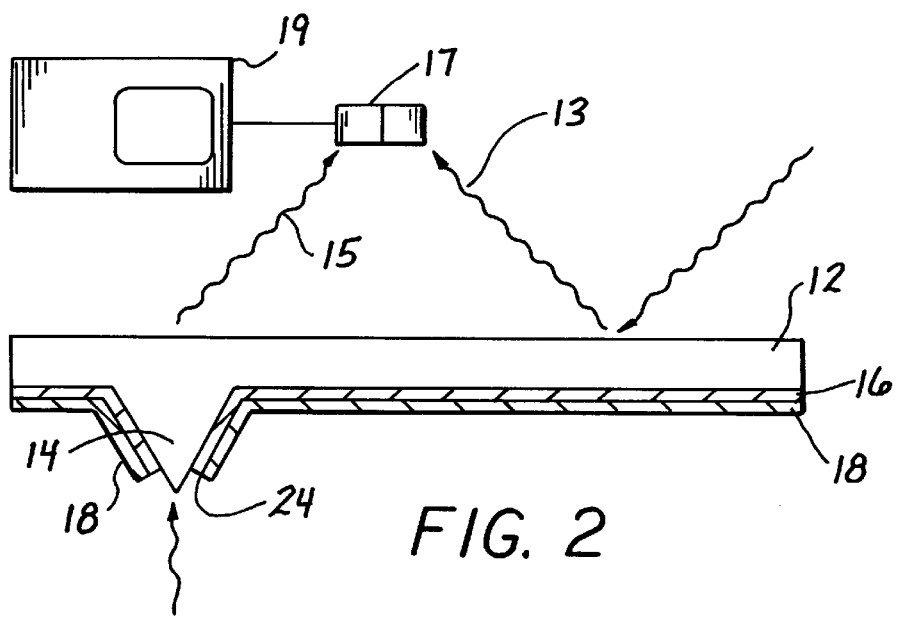
FIG. 2 is a simplified diagrammatic side view of the probe of FIG. 1 after it has been subjected to the fabrication technique of the invention.
Figure 3:
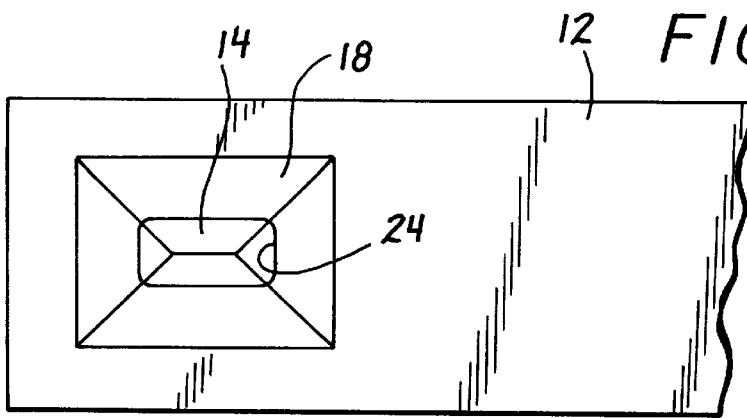
FIG. 3 is the top plan view of a probe tip fabricated according to the methodology described in connection with FIGS. 1 and 2.

First, consider a method of nanofabrication using voltaic removal in connection with FIGS. 1–7c, and then we shall consider nanofabrication using focused beam removal in connection with FIGS. 8a–9d. The nanofabrication process of the invention includes as a basic step the opening of a nanometer-scale hole in a conducting film. A top plan view of probe 10 is shown in FIG. 3 wherein hole 24 is defined in conducting film 18 and is generally rectangular as defined by the geometry of triangular faces pyramidal tip 14. The process for forming hole 24 is determined by the distance between substrate 20 and tip 14 as shown in FIG. 1, the voltage applied between the two and the shape of tip 14.

This conducting film, which may be metallic or semiconducting, is first deposited on a sharp probe tip 14 as shown in FIG. 1. The probe, generally denoted by reference numeral 10, is comprised of a cantilever beam 12 and a probe tip 14. The probe, however, need not be in the shape of a cantilever beam and can be fashioned in the form of a sharp needle like in a scanning tunneling microscope. Beam 12 and tip 14 may be integrally manufactured or separately manufactured according to any of the probe designs and methodologies now known in the art or later devised. How the probe tip and cantilever beam are fabricated is only incidental to the invention and therefore will not be further detailed.

A conducting film 16 is then disposed on probe tip 14 and at least a portion of the underside of beam 12 and on tip 14. For example, beam 12 and probe tip 14 may be comprised of silicon nitride and fabricated to the shape shown in FIG. 1 using convention microlithographic processes. Tip 14, in particular, is typically defined by forming an etch pit in a crystalline substrate with an anisotropic etchant. Certain crystalline planes are preferentially etched, ultimately resulting in a four sided pyramidal etch pit in the substrate. Again the exact shape of tip 14 is incidental to the teaching of the invention other than being characterized by a sharp point with a high radius of curvature. A reinforced needle-like tip could be as consistent with the teachings of the invention as a pyramidal tip of some form. The silicon nitride or other material is then disposed on the substrate and into the etch pit. The underlying substrate, which has thus acted as a mold, is then etched away leaving probe 10 comprised of beam 12 and tip 14. Thin metallic film 16 is then disposed by any means desired onto probe 10.

In the preferred embodiment, the silicon nitride cantilever beam 12 and tip 14 have a thin titanium binding layer 16 first disposed on probe 10. Titanium layer may typically be between 60 to 100 angstroms thick. Thereafter, a conducting film 18 is disposed on the binding layer 16. Again, in the preferred embodiment, conducting film 18 is comprised of a noble metal, or more particularly gold, and may be of 300 to 800 angstroms thick.

Probe 10 is then brought into the near proximity of a flat, electrically conducting sample substrate 20. A voltage pulse as described below is then applied between sample substrate 20 and probe 10 by circuit 22. A self-limiting hole 24 is then voltaicly formed into conducting film 18 leaving a nanometer-sized hole or sensor area at the end of tip 14 which can be repeatedly defined without difficulty.

The distance between tip 14 and the surface of conducting sample substrate 20 is controlled and monitored by the particular physical interaction selected to provide the relationship between sample substrate 20 and probe 14. In this manner, the physical distance of separation between tip 14 and sample substrate 20 can be very accurately and repeatedly controlled. For example, in an atomic force microscope, the tip-to-sample force is controlled so that the force is maintained in the nanonewton range as determined by the degree of deflection of beam 12. In the preferred embodiment the tip-to-sample distance is of the order of 1 angstrom. Once the distance between tip 14 having conducting film 18 disposed thereon and sample substrate 20 is set, a voltage pulse is applied from source 22 between conducting film 18 and conducting substrate 20. Due to the sharpness of probe tip 14, the electric field is highest near the apex of tip 14. For example a 1 volt square wave pulse produces an electric field strength of the order of $10^9$ to $10^{10}$ volts per meter. Under such high electric field strengths, conducting film 18 on probe tip 14 evaporates and deposits on the surface of sample substrate 20. By this means, hole 24 is opened up in metal film 18.

Every metal has a threshold electric field, $E_{th}$, which must be exceeded before evaporation takes place. For a particular tip-to-sample voltage, the electric field near the tip may exceed this threshold and therefore metal evaporation can occur. However, the field strength decreases rapidly as one moves away from the apex of tip 14, since the distance between the apex and the sample increases. Beyond a certain radius from the apex of tip 14, the electric field falls below the threshold and no evaporation occurs. Hence, the border of hole 24 is self-limiting and repeatably defined by Eth, the tip shape at the apex and the electric field gradient in which the tip is placed. This parameters are repeatable from one probe to another with a high degree of accuracy.

The radius of hole 24 thus corresponds to the location of the threshold field on film 18 which in turn is controlled by the voltage applied to tip 14 from source 22 as well as the sharpness of tip 14. Higher voltages and blunt tips produce larger holes, whereas lower voltages and sharp tips produce smaller holes.

In the atomic force microscope probe described above in connection with FIGS. 1–3, fabricated of silicon nitride, holes of the order of 50 to 200 nanometers can be repeatedly manufactured in gold films deposited on probe 10. It is thus to be expressly understood that although the illustrated embodiment is described in terms of an atomic force microscope probe, any type of sensor in which a reliably or repeatedly defined tip hole is an operative part may employ the method of the invention to advantage. It is presently contemplated that scanning tunneling microscope as well as near-field optical probes will be able to immediately use the nanofabrication technique of the invention with profit.

The making of a nanometer-scale hole in a sharp tip 14 is the first step in making a completed sensor. Note in connection with FIG. 3 that typically due to small imperfections, the apex of pyramidal tip 14 does not define a point. While theoretically the triangular surfaces of tip 14 should each meet at a point, this is often not the case. Instead, the apex of tip 14 will be a dihedral angle between two opposing surfaces and hence give rise to a rectangular shape for hole 24 as opposed to a square one. Hole 24 may even be trapezoidal since often the opposing triangular surfaces of the tip are not symmetric. In some cases, one triangular surface may be more inclined than the opposing surface and therefore provide a more gentle slope, hence giving rise to a trapezoidally shaped hole 24.

Figure 4:
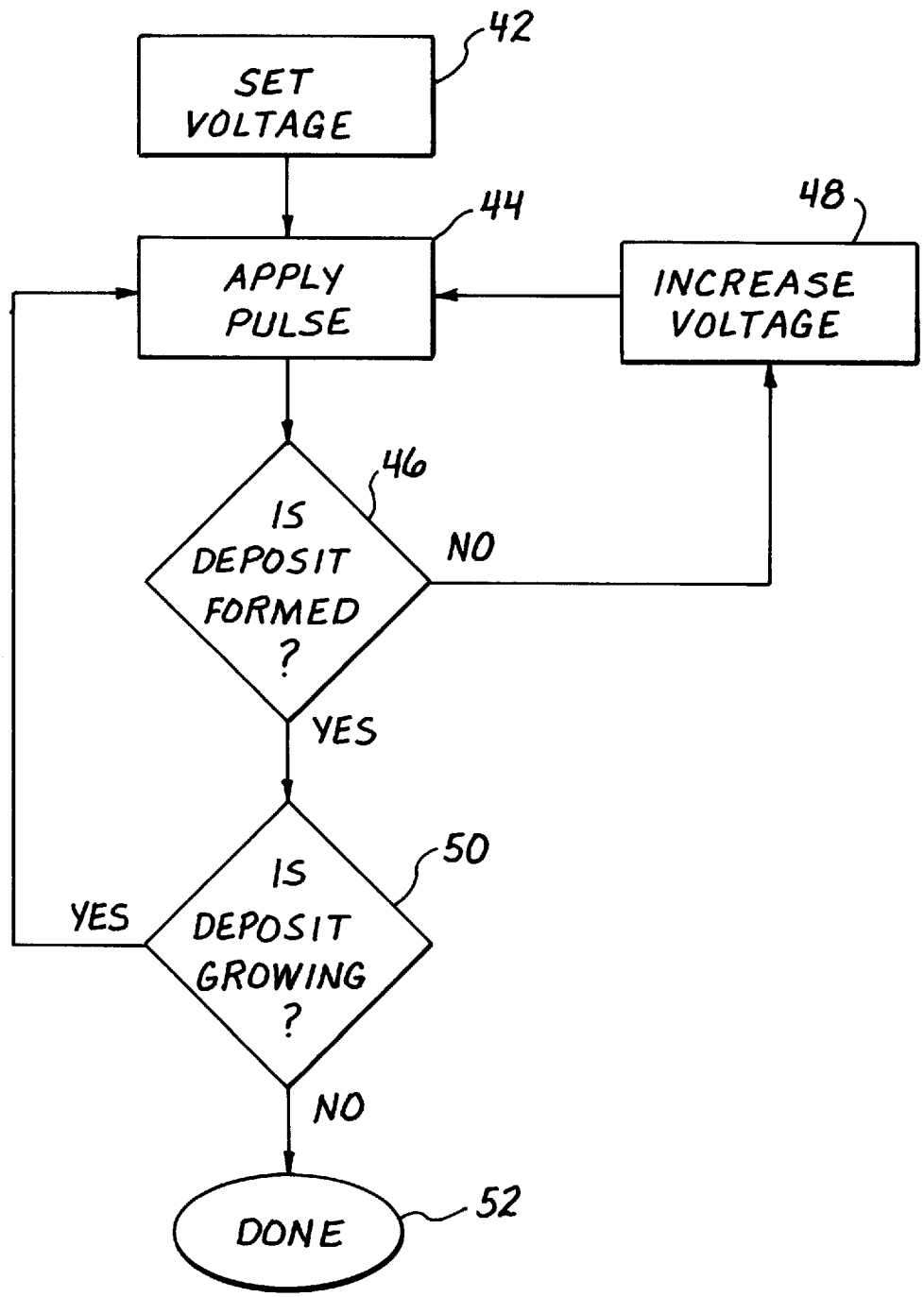
FIG. 4 is a flow chart depicting the basic steps of the methodology of the invention.

FIG. 4 is a flow diagram which illustrates the methodology practices in each of the embodiments of the invention. The process begins at step 42 in which the voltage applied between substrate 20 and probe 10 is set. This voltage may be initially set below one volt and is typically set between 0.5 and 1.0 volt. At step 44, a square wave voltage or other shaped envelope is applied between the conductive layer disposed on probe 10 through which a hole is being formed and sample substrate 20. A test is then made at step 46 to determine whether or not evaporation has occurred and deposition of the metal or other material has been made onto sample substrate 20. Probe 10 itself is used as an atomic force scanning probe to determine if such deposit is formed. If no deposit is formed, then the voltage is increased at step 48, and a higher voltage pulse applied again at step 44 as before.

However, if a deposit is detected, then a determination is made at step 50 whether or not the deposit is increasing in size over the application of the last pulse during which there was a deposit on substrate 20, if any. If the deposit is continuing to grow in size as measured by probe 10, then the process returns to step 44 and a pulse again is reapplied at the then current voltage. The process continues and the deposition of metal or other material onto substrate 20 is monitored until the deposit ceases to grow by virtue of its self-limiting physics. After it is determined that self-limitation has been achieved, the process is terminated at step 52.

Consider the fabrication of an optical/atomic force scanning probe. In near-field optical microscopy, the scanning tip normally uses a tapered optical fiber with a metal coating on top and a nanometer-scale hole in the metal coating at the end of the tapered fiber tip. By scanning this probe across a surface, surface features smaller than the wave length of the reflected light can be optically imaged into the fiber. However, the problem which such fiber optic probes is that the probe tips are extremely fragile and often break. In addition, the light transmitting efficiency is sometimes unacceptably low.

By using a nanofabrication process as illustrated in FIGS. 1–3, holes 24 can be made in metal films 18 in standardized and commercially available silicon nitride probes as are currently extensively used in atomic force microscopes. These probes are of a design which are very rugged and have sensing characteristics which are very well characterized. The taper angle of probe tip 14 is such that the optical transmission efficiency is higher than in an optic fiber and the silicon nitride material of probe tip 14 can itself be utilized in place of the optical fiber. In such a probe tip then simultaneous scanning of a sample surface can then be made using both atomic force and near-field optics as the scanning relationship from which a microscopic image can be formed. The two sensed signals 13 and 15, namely the reflected beam signal 13 which is an atomic force microscopic signal, and the transmitted probe tip signal 15 which is a near-field optical signal transmitted through hole 24 of tip 14 from the sample, can thus be simultaneously read by detector assembly 17 shown diagrammatically in FIG. 2. These two signals 13 and 15 can be combined by a scanning computer 19 to provide a calculated two parameter image or a cross-correlated image of a sample.

Figure 5A:
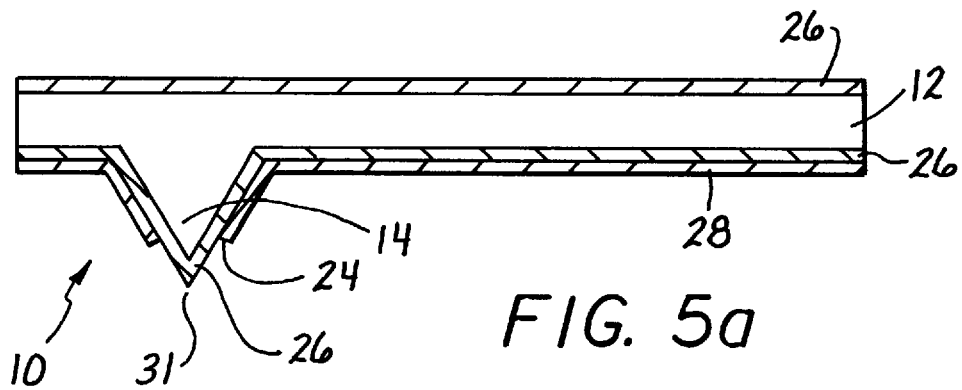
FIG. 5a is a simplified side cross sectional view of an alternative embodiment of a probe devised according to the present fabrication shown at a first intermediate state of completion.

Hole 24 in conducting film 18 can also be used as a mask for subsequent selective etching steps used in the fabrication of other kinds of sensors. For example, consider a doped silicon atomic force microscopic probe 10 on which an oxide film 26 has been grown or deposited by conventional means and processes as depicted in the simplified side cross-sectional view of FIG. 5a. A thin metal film 28 is then deposited on oxide film 26 or at least on its bottom surface and a hole 24 evaporated in metal film 28 at apex 32 of tip 14 leaving the apex 31 of oxide layer 26 exposed as shown in FIG. 5a.

Figure 5B:
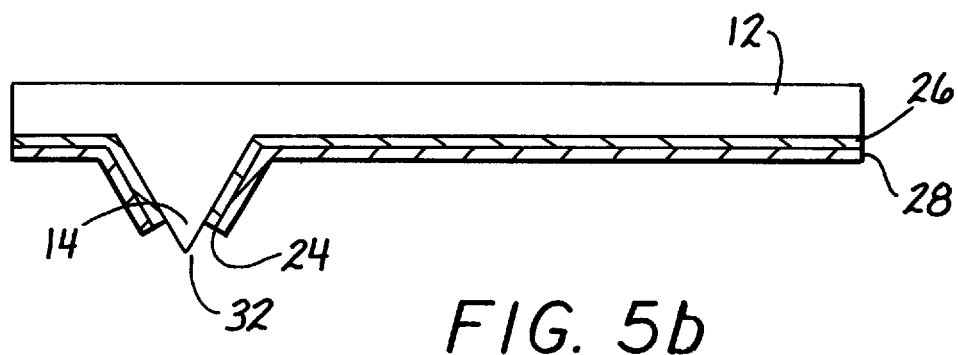
FIG. 5b is the probe of FIG. 5a after it has been subject to a selective oxide etching to expose the apex of the tip.
Figure 5C:
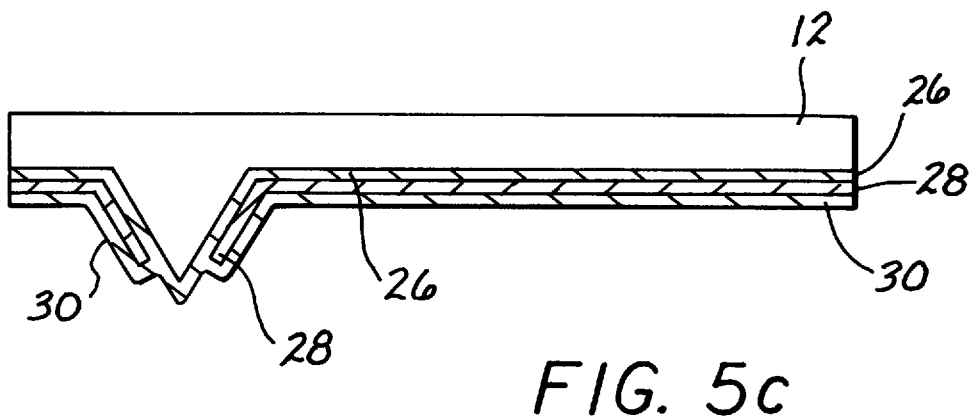
FIG. 5c is the probe of FIGS. 5b after a metal film deposition by which a Schottky diode is formed.

Again, thin metal film 28 may in fact be comprised of a binding layer of a first metal such as titanium followed by a second conductive layer, such as gold. Throughout the balance of the specification it is to be understood that wherever the deposition of a metal layer is discussed it may include the deposition of a composite metal layer comprised of a binding layer and the second layer. Metal film 28 in the form as shown in FIG. 5a then serves as a mask for oxide layer 26 which can be selectively etched by conventional means to expose apex 32 of the silicon nitride tip 14 as shown in FIG. 5b. Once oxide layer 26 is etched away a bare silicon exposed apex 32 of tip 14 is exposed and a second metal film 30 can then be deposited to form a Schottky diode as shown in FIG. 5c. It is well established that Schottky diodes can be used as temperature or optical sensors.

Therefore, the probe of FIG. 5c can be used simultaneously for temperature sensing, optical sensing, and as an atomic force microscope probe in a manner analogous to that described in FIG. 2. Still further, the device of FIG. 5c may again be subject to voltage pulsing in the same manner as described in connection with FIGS. 1–3 to define a second hole through the oxide and metal layers if additional sensor structure is desired.

Figure 6A:
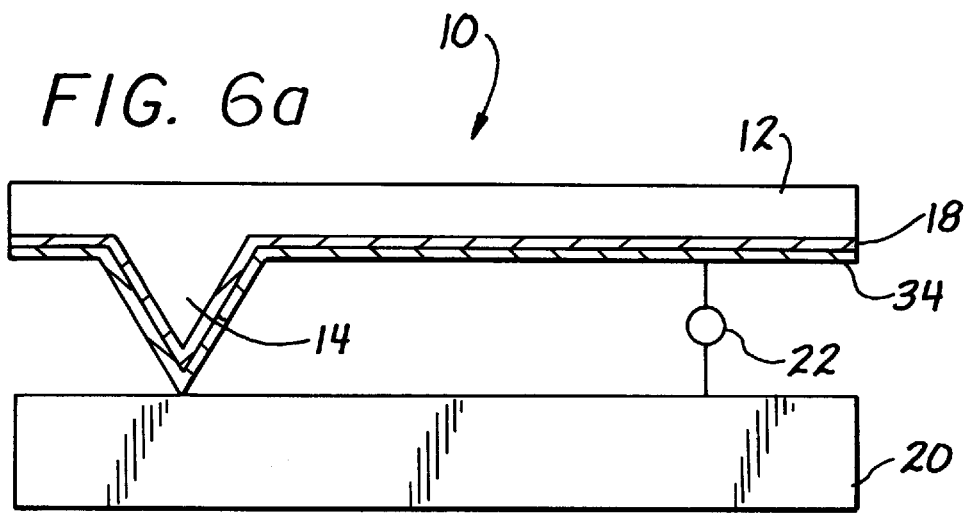
FIG. 6a is a simplified side cross sectional view of a partially fabricated thermocouple sensor.
Figure 6B:
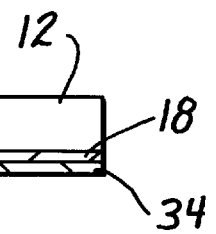
FIG. 6b is the probe tip of FIG. 6a after a hole has been defined in the tip defined of metal A and a second metal, metal B, is deposited.
Figure 6C:
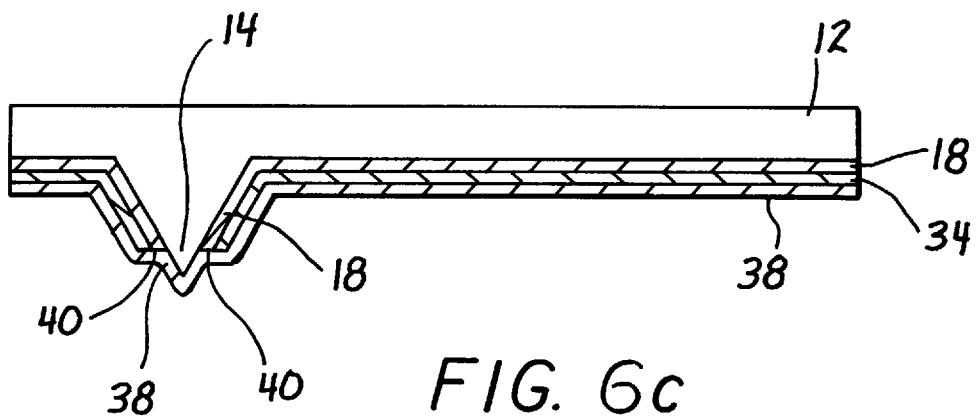
FIG. 6c is the completed thermocouple junction formed by the process illustrated in FIGS. 6a and 6b.

FIGS. 6a–c illustrates another sensor made from the methodology of the invention. In FIG. 6a, probe 10 has a metal film 18 disposed thereon as described in connection with FIG. 1 followed by disposition of an oxide layer 34 disposed on metal film 18. Once again, a hole 36 is voltaicly defined through the oxide layer 34 and metal layer 18 at the same time thereby defining hole 36 as shown in FIG. 6b. A second metal is then deposited on probe 10 to make a bimetal thermocouple junction at the end of the probe tip 14 as shown in FIG. 6c which can be used as a combined scanning thermal microscope and atomic force microscope with the thermocouple junction being formed between the contacting interface 40 of metals 18 and 38.

Figure 7A:
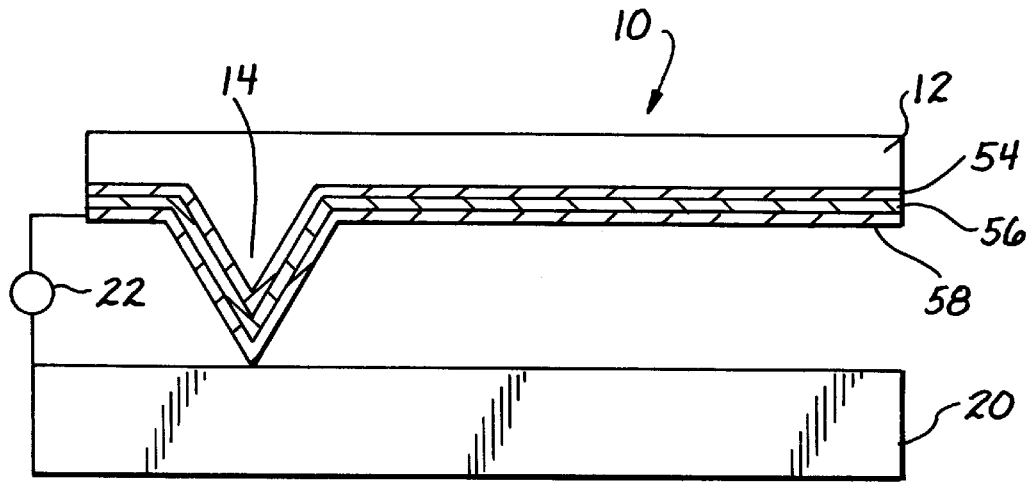
FIGS. 7a–c are simplified cross sectional side views of another embodiment of the methodology of the invention by which a metal-to-metal thermocouple junction may be fabricated.
Figure 7B:
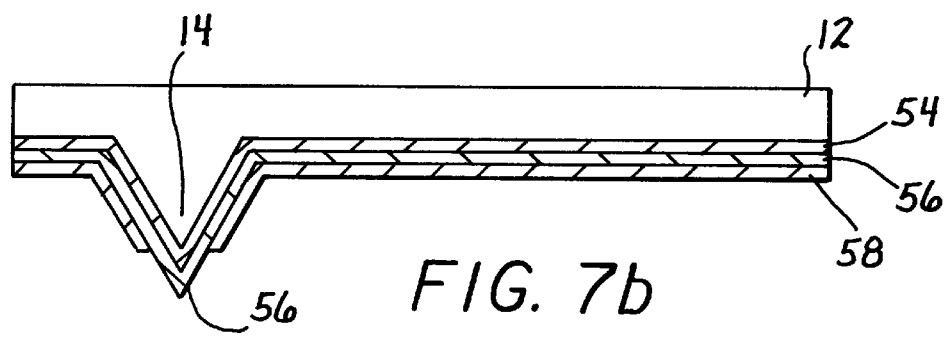
Figure 7C:
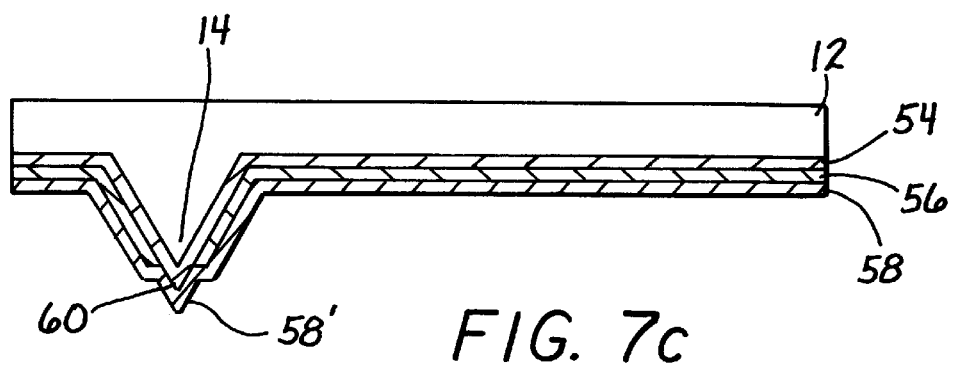

Another embodiment of the thermocouple sensor is shown in the process of FIGS. 7a–c. As in the case of the process of FIG. 6a–c, probe 10 has a first metal layer 54 disposed thereon, after which an oxide layer 56 is grown or otherwise formed on metal layer 54. Second metal layer 58 is then disposed on oxide layer 56, resulting in the structure shown in FIG. 7a. A voltage pulse is then applied between the metal layer 58 of probe 10 and substrate 20. A defined hole is then blown or evaporated through metal layer 58 so that layer 58 can then serve as a mask for the exposed portion of oxide layer 56. Exposed oxide layer 56 is then removed through conventional means such as ion etching and the second metal again vapor deposited to form a layer 58' to form a two metal thermocouple junction 60 on the apex of tip 14 as shown in FIG. 7c.

Figure 8A:
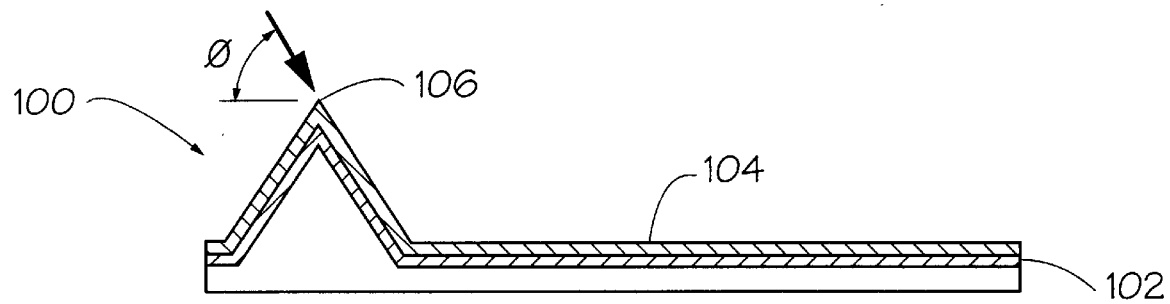
FIGS. 8a and 8b are simplified cross-sectional side views depicting the method of making a probe capable of dual simultaneous sensing in which the sensing junction is formed at the probe tip using a focused ion or electron beam.
Figure 8B:
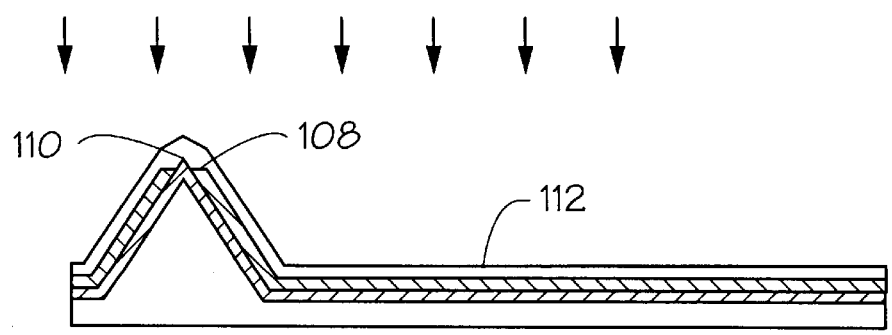

FIG. 8a shows a silicon or silicon nitride cantilever probe 100 on which is grown or disposed a metal, a doped semiconductor or polymeric layer 102. A polymeric layer is defined to include any type of polymeric film or hydrocarbon layer. Layer 102 is deposited, grown, ion implanted or formed by any means now known or later devised. Layer 102 is shown as a film, but need not take that type of physical embodiment, but can include any type of base structure desired. An insulating layer 104 is then disposed, deposited or grown on layer 102. A focused electron or ion beam is directed at an angle θ from the plane of the cantilever beam to expose tip 106 defined in layer 104. A hole 108 as shown in FIG. 8b is drilled or formed by the beam through layer 104. The mechanism of drilling could be due to mechanical impact, chemical reaction or a combination of both. The chemical reaction can be induced either by the ionized focused beam or by an electron beam in the presence of gases. For example, layer 104 could be a hydrocarbon film which will etch away under electron beam bombardment in the presence of oxygen. Drilling or hole formation is stopped as soon as layer 102 is exposed. Termination of the drilling is determined either by real-time observation of the hole formation using electron microscopy which is conveniently performed in the application of the focused beam, or by calculating or empirically determining the removal or drilling rate of the beam into the material in question.

In the case where a polymeric or hydrocarbon layer is deposited on cantilever 12, in the preferred method a mixture of methane and hydrogen is introduced into a plasma chamber with a flow rate of 4:20 sccm respectively. At 75 mTorr chamber pressure and 500 V radiofrequency bias, a plasma of carbon and hydrogen is formed and a film is deposited on the cantilever probe. The deposition rate under these conditions is typically on the order of 1–10 nm/min. Cantilever probe 12 with the hydrocarbon film on it, can be introduced into an environmental scanning electron microscope (ESEM). It has been previously shown that electron microscopy can be performed in ESEM in the presence of gases. When the electron beam is used in a spot mode and focused on the probe tip in the presence of oxygen, the hydrocarbon film etches away. Although the mechanism is not clearly understood, it is most probably due to the formation of an oxygen plasma by the focused electron beam or the secondary electron emitted from the surface. The oxygen radicals then react with the hydrogen and carbon in the hydrocarbon film and form water and carbon dioxide or monoxide which evaporates. In this way a hole can be formed in the hydrocarbon film only at the tip. The hydrocarbon film can be used directly as an insulating layer with a hole at the tip or can be used for further masking of the underlying layers on the cantilever probe.

A short plasma or reactive ion etching can be performed to ensure that layer 102 is exposed only at its exposed defined tip 110 exposed by hole 108. For example, removal by the electron or ion beam may leave a very thin film of material of layer 102 inside the holed drilled into it. A quick directional etch will remove this thin layer of insulating material without substantially compromising the insulating quality of the remaining portions of layer 102.

Layer 112 of metal or semiconductor is disposed to make electrical contact to layer 102 only at tip 110. The junction between layers 112 and 102 at tip 110 can produce metal-to-metal, metal-to- semiconductor or semiconductor-to-semiconductor devices such as thermocouples, Schottky diodes, and pn junctions, which can be used for a variety of scanning probe measurements.

Figure 9A:
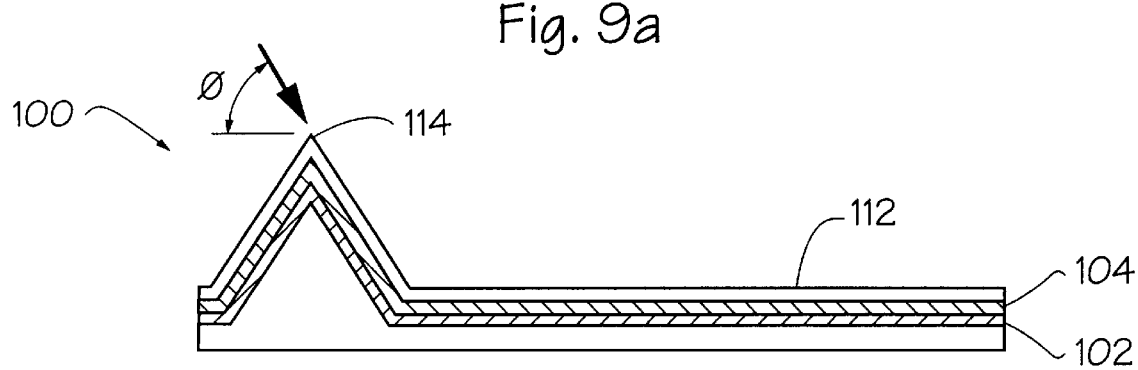
FIGS. 9a–9d are simplified cross-sectional side views of another embodiment of a method of making a probe capable of dual simultaneous sensing in which the sensing junction is formed at the probe tip using a focused ion beam in such a manner that injection of ion impurities into the tip junction is avoided.

The use of focused ion beam drilling can, however, introduce foreign ions into the fabricated device, usually gallium ions, which are used in the beam. In some cases this can change the junction characteristics in a way which might not be desired. To avoid this the embodiment of FIGS. 9a–d is proved. In FIG. 9a probe 100 is provided with layer 102, 104 and 112, but without the formation of any hole therein to provide a composition sandwich of layers with an exposed defined tip in layer 112.

Figure 9B:
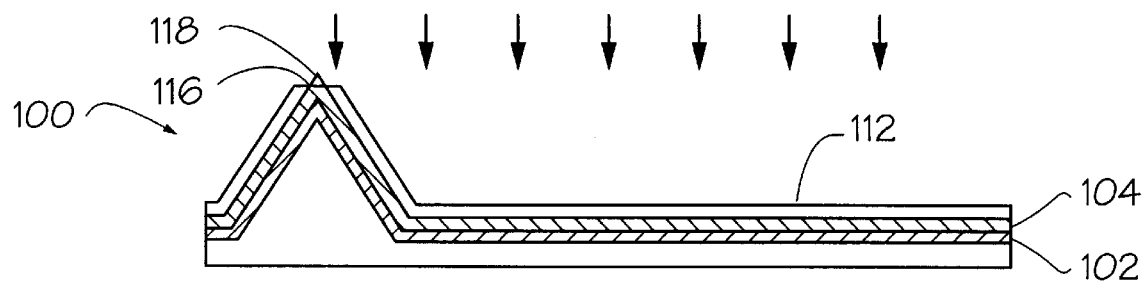
Figure 9C:
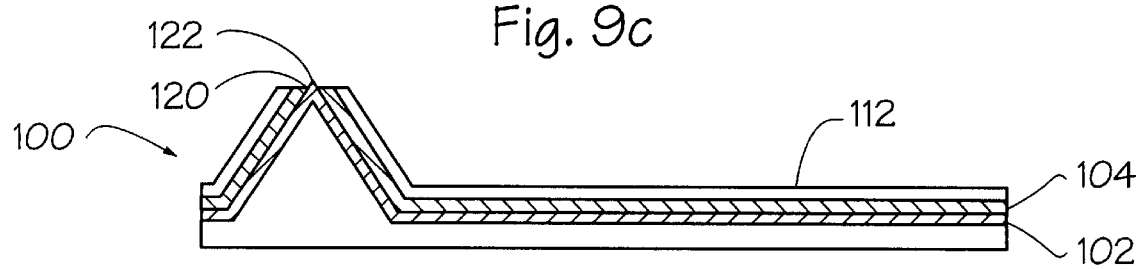
Figure 9D:
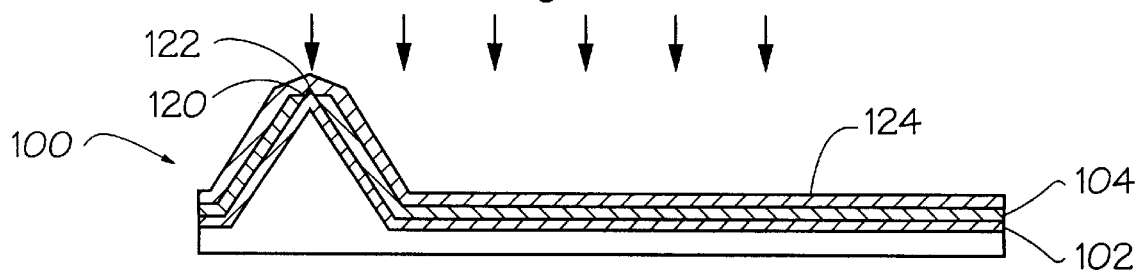

A hole is then drilled through layer 112 at tip 114 as similarly described in connection with the procedure described in FIG. 8a as shown in FIG. 9b to define a hole 116 through layer 112 defining an exposed tip 118 in layer 104. The exposed portion of layer 104 is then removed using a conventional etching technique, including but not limited to wet etching, plasma etching or reactive ion etching to define a hole 120 in layer 104 and to define an exposed tip 122 of layer 102. Layer 112 may now be totally removed, taking any impurities which have been introduced into it by the focused ion beam, and as shown in FIG. 9d a semiconductor or metallic layer 124 disposed on layer 104 to make electrical contact only with tip 122 of layer 102 in a manner similar to that described in connection with FIG. 8b. The material of layer 124 may be the same as or different from that which formed semiconductor or metallic layer 112 according to the design objective sought.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a method for forming a sensor comprising:
   providing a probe with a pointed tip having an apex;
   disposing a first layer on said probe and on said tip of said probe;
   disposing a second layer on said first layer;
   focusing a charged beam on said tip of said probe to define a hole through said second layer to expose said first layer over said apex; and
   disposing a third layer over said second layer and said exposed portion of said first layer over said apex to form a junction between said third and first layers over said apex, said junction forming a sensing device,
   whereby a probe with a dual sensing device is fabricated.

2. The improvement of claim 1 wherein focusing said charged beam, focuses a beam of ions on said tip.

3. The improvement of claim 1 wherein focusing said charged beam, focuses a beam of electrons on said tip.

4. The improvement of claim 1 where disposing said first layer on said probe comprises disposing a conductive layer of metal, semiconductor or polymeric material on said probe.

5. The improvement of claim 4 where disposing said second layer on said first layer comprises disposing an insulating layer on said first layer.

6. The improvement of claim 1 where disposing said third layer over said second layer comprises disposing a conductive metal, semiconductor or polymeric layer on said second layer to form an electrically active junction between said first and third layers.

7. The improvement of claim 1 wherein said probe is comprised of an optically transmissive material and where said improvement further comprises providing an optical detector for receiving light through said tip of said probe through said hole defined in said first conductive layer to provide a near-field optical sensor.

8. An improvement in a method for forming a sensor comprising:
   providing a probe with a pointed tip having an apex;
   disposing a first layer on said probe and on said tip of said probe;
   disposing a second layer on said first layer;
   disposing a third layer over said second layer;
   focusing a charged beam on said tip of said probe to define a hole through said third layer to expose said second layer over said apex;
   removing said exposed portion of said second layer disposed over said apex to expose said first layer disposed over said apex; and
   disposing a fourth layer over at least said exposed portion of said first layer to form a junction between said fourth and first layers,
   whereby a probe with a dual sensing device is fabricated.

9. The improvement of claim 8 wherein focusing said charged beam, focuses a beam of ions on said tip.

10. The improvement of claim 8 wherein focusing said charged beam, focuses a beam of electrons on said tip.

11. The improvement of claim 8 where disposing said first layer on said probe comprises disposing a layer of polymeric material, metal or semiconductor on said probe.

12. The improvement of claim 11 where disposing said second layer on said first layer comprises disposing an insulating layer on said first layer.

13. The improvement of claim 12 where disposing said third layer over said second layer comprises disposing a conductive metal, semiconductor or polymeric layer on said second layer.

14. The improvement of claim 8 where disposing said fourth layer over at least said exposed portion of said first layer disposes a layer of material identical to the composition of said third layer, but without impurities injected by the focusing of said charged beam on said second layer.

15. The improvement of claim 8 where disposing said fourth layer over at least said exposed portion of said first layer disposes a layer of material different than the composition of said third layer, and is without impurities injected by the focusing of said charged beam on said second layer.

16. The improvement of claim 8 wherein said probe is comprised of an optically transmissive material and where said improvement further comprises providing an optical detector for receiving light through said tip of said probe through said hole defined in said first conductive layer to provide a near-field optical sensor.

17. The improvement of claim 8 where disposing a fourth layer over at least said exposed portion of said first layer to form a junction between said fourth and first layers forms an electrically active junction.

18. The improvement of claim 8 where disposing said first layer on said probe and on said tip of said probe disposes a semiconductive material and where disposing said fourth layer over at least said exposed portion of said first layer disposes a metallic layer so that a Schottky diode is formed at said apex of said tip.

19. The improvement of claim 8 where disposing said first layer on said probe and on said tip of said probe disposes a first type of metallic layer and where disposing said fourth layer over at least said exposed portion of said first layer disposes a second type of metallic layer so that a thermocouple junction is formed at said apex of said tip.

20. The improvement of claim 8 where after removing said exposed portion of said second layer disposed over said apex to expose said first layer disposed over said apex, a quick directional etching is made of said second layer to remove any remaining traces of said second layer within said hole while leaving remaining portions of said second layer beyond said hole substantially intact on said first layer.

* * * * *